No. 745,959. PATENTED DEC. 1, 1903.
N. FOX.
FRICTION CLUTCH.
APPLICATION FILED SEPT. 8, 1902.
NO MODEL. 2 SHEETS—SHEET 1.
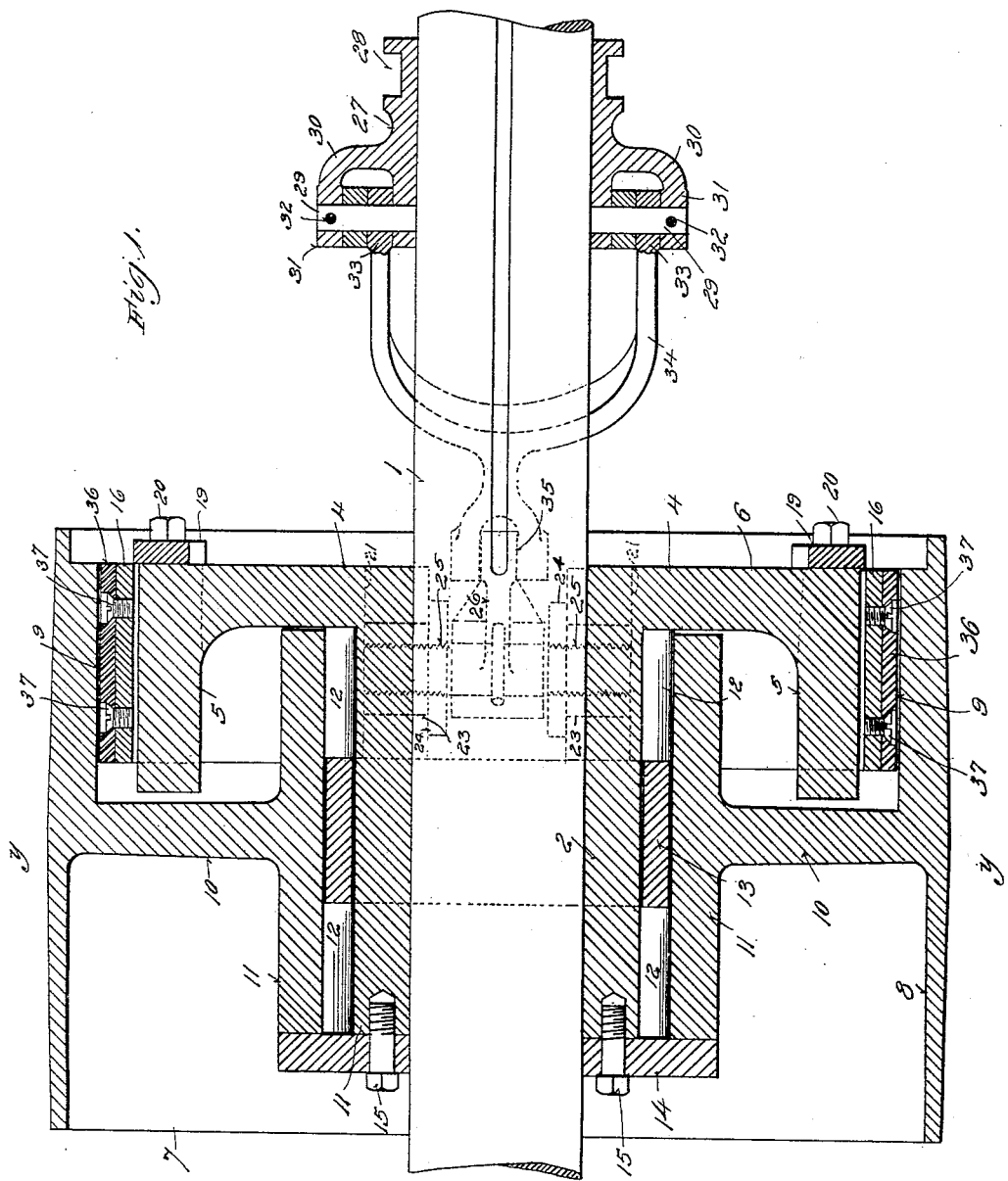
WITNESSES:
INVENTOR.
Nat Fox,
BY
ATTORNEY.

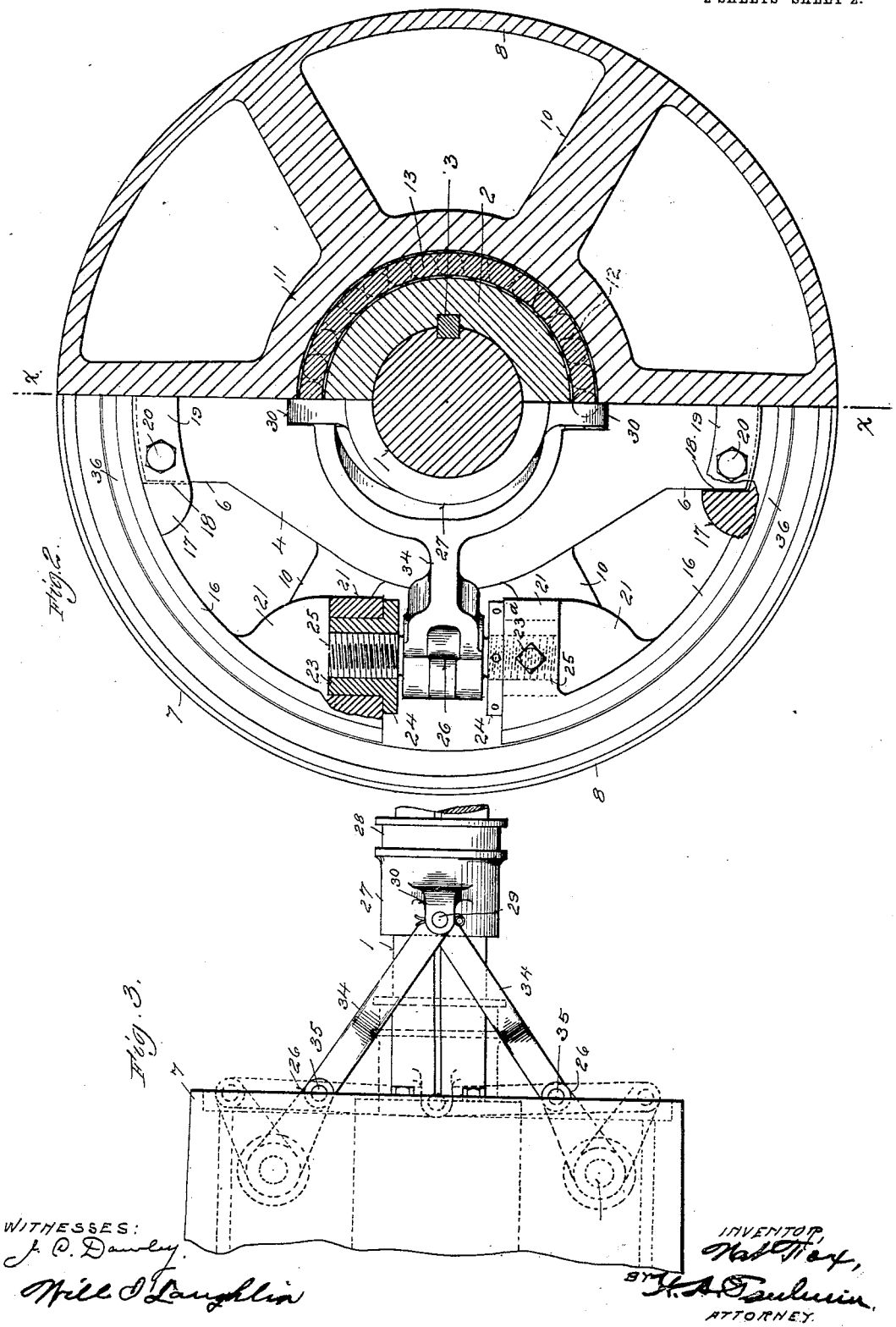

No. 745,959. Patented December 1, 1903.

UNITED STATES PATENT OFFICE.

NAT FOX, OF SPRINGFIELD, OHIO, ASSIGNOR OF TWO-THIRDS TO LEWIS S. LITTLE AND CYRUS A. LITTLE, OF SPRINGFIELD, OHIO.

FRICTION-CLUTCH.

SPECIFICATION forming part of Letters Patent No. 745,959, dated December 1, 1903.

Application filed September 8, 1902. Serial No. 122,456. (No model.)

*To all whom it may concern:*

Be it known that I, NAT FOX, a citizen of the United States, residing at Springfield, in the county of Clark and State of Ohio, have invented certain new and useful Improvements in Friction-Clutches, of which the following is a specification, reference being had therein to the accompanying drawings.

This invention relates to friction-clutches, and more particularly to that class of clutches in which there is employed a shaft, a spider carrying engaging devices and having a sleeve-like hub secured on the shaft, and a pulley having its hub loosely mounted on said sleeve-like hub and provided with a roller-bearing interposed between the two.

The object of my present invention is to produce a friction-clutch of this type in which the efficiency and durability of the roller-bearing may be increased, in which the engagement between the arms of the spider and the shoes of the clutch may be rendered more effective, and which embodies improved mechanism for effecting the engagement and disengagement between the shoes and pulley.

To these ends my invention consists in certain novel features, which I will now proceed to describe and will then particularly point out in the claims.

In the accompanying drawings, Figure 1 is a view of a clutch embodying my invention, the same being in section upon the line *x x* of Fig. 2. Fig. 2 is an elevation of the same, half in section, upon the line *y y* of Fig. 1; and Fig. 3 is a detail view in elevation of a portion of the clutch.

In the said drawings, 1 indicates the shaft, which may be either a driving or a driven shaft and which has secured thereon a sleeve or hub 2—as, for instance, by means of a key 3. This hub forms part of a spider 4, having two arms extending radially outward in opposite directions and terminating in driving-lugs 5, having substantially parallel sides 6. 7 indicates the pulley as a whole, the same comprising the rim 8, provided with a friction-surface 9 and spokes 10, connecting the rim with a cylindrical hub 11, which fits loosely over the cylindrical hub 2, the central transverse plane of the pulley coinciding with the central transverse plane of the hub or sleeve 2. The space between the shaft-hub 2 and pulley-hub 11 forms a raceway, in which are arranged two series of bearing-rollers 12, located near the respective ends of the hubs, the central space between them being filled by a spacing-ring 13, which fits loosely between the two hubs. The series of rollers 12 at one end of the hubs are retained in position by the body of the spider 4, against which they abut, while the series of rollers 12 at the other end of the hubs are held in position by a flange or annulus 14, secured to the end of the hub or sleeve 2 by bolts 15 or in any other suitable manner.

It has been found by experience that the hubs 2 and 11 should be made as long as possible in order to properly distribute the strains and provide a suitably large bearing area, and when this is done and antifriction-rollers are employed which are of a sufficient length to extend from one end of the space between the hubs to the other it has been found that these rollers tend to lose their parallelism with the axis of the shaft, and thus become rapidly worn at the ends, thereby destroying the efficiency of the bearing. This difficulty I have overcome by employing a separate series of short rollers at each end of the bearing, retaining the same in position by means of a spacing-ring, which fills the space between the two series in a direction longitudinally of the bearing. By reason of this construction the rollers are reduced to a practicable length, and the unequal wear and binding action occurring in connection with longer rollers are done away with.

The friction-shoes—two in number—comprise each a segmental body 16 almost semicircular in extent and provided with lugs 17, having parallel bearing-faces 18, between which the driving-lugs 5 on the ends of the spider-arms fit. These lugs 5 are preferably provided with protecting-plates 19, which are secured in position by screw-bolts 20 and extending over the lugs 17, so as to cover and protect the same. By reason of this construction the shoes are positively engaged and driven by the spider-arms without bringing undue strain upon the shoe-adjusting mechanism, hereinafter referred to.

The shoes are adjusted and operated in the following manner: Each shoe is provided at each of its ends with a projection 21, having thereon a lug 22, in which is mounted a sleeve-nut 23, provided with an apertured flange 24, by means of which it may be rotated by a suitable tool. These lugs and their sleeve-nuts lie opposite or facing each other and in pairs, and each pair receives the right and left threaded opposite ends of a screw-shaft 25, which has secured to or formed thereon a projecting radial arm 26. 27 indicates a sleeve mounted to slide longitudinally on the shaft 1 and preferably splined thereon, said sleeve having the usual groove 28 to receive an operating-lever, by means of which its movement longitudinally of the shaft is imparted to it. Studs or pins 29 extend radially outward from the inner end of this sleeve parallel with the spider-arms 6 and are preferably supported by lugs 30, extending outward from the body of the sleeve and having eyes 31, in which the outer ends of the studs 29 fit. The studs are thus supported at their inner ends in the body of the sleeve and at their outer ends in the eyes of the lugs 30 and are removably secured in position by means of cotters or keys 32 passing through the walls of the eyes of the lugs and through the outer ends of the pins. On the bodies of these pins are mounted the terminal eyes 33 of two yoke-levers 34, extending in diverging directions therefrom and pivoted at 35 to the outer ends of the respective arms 26. It will be seen that by a movement of the sleeve 27 longitudinally of the shaft the shoes may be forced against the friction-surface 9, so as to cause the pulley and shaft to rotate in unison, while by a reverse motion the connection between the pulley and shaft may be broken. By the employment of the yoke-levers 34 the strain of pressing the shoes against the friction-surface is distributed on both sides of the sleeve 27 from each shoe, and thereby equalized.

It will be understood, of course, that the initial position of the shoes may be independently adjusted by rotating the sleeve-nuts 23, so as to insure an equal contact of both shoes at all points thereof. The sleeve-nuts may be secured in position after adjustment by set-screws 23ª. It will also be understood that each shoe will be provided with a suitable friction-surface 36, of vulcanized fiber or other suitable material, secured in position on the body of the shoe by countersunk screws 37 or in any other suitable manner.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. In a clutch, a shaft, a spider carrying engaging devices and provided with a long sleeve-like hub secured on the shaft and having heads at its ends, one of which is removable, a pulley or the like centrally located with respect to said sleeve-like hub, adapted to be engaged by the engaging devices of the spider, and having an extended hub loosely surrounding said sleeve-like hub and fitting between the heads thereof, two series of relatively short antifriction-rollers located in the space between the pulley-hub and shaft-hub at each end thereof, the heads of the shaft-hub forming end stops for said rollers in one direction, and a spacing-ring located centrally between the two series of antifriction-rollers and forming end stops for the same in the other direction, substantially as described.

2. In a friction-clutch, the combination, with a normally loose pulley provided with a friction-surface, of a shaft, a spider secured thereon and having arms projecting in diametrically opposite directions, a pair of friction-shoes adapted to slide radially on the spider, right and left threaded shafts engaging the adjacent ends of the shoes, arms projecting from said shafts, a sleeve adapted to slide longitudinally of the shaft and provided with pins projecting radially parallel with the spider-arms, and diverging yoke-shaped levers embracing the shaft, pivotally mounted on the pins of the sleeve at one end, and having their other ends connected to the respective screw-shaft arms, substantially as described.

In testimony whereof I affix my signature in presence of two witnesses.

NAT FOX.

Witnesses:
E. O. HAGAN,
IRVINE MILLER.